Jan. 20, 1931.　　　　J. BRICKEN　　　　1,789,862
SAFETY DEVICE FOR ROTATING SHAFTS AND LOAD INDICATORS
Filed March 2, 1926　　　3 Sheets-Sheet 1
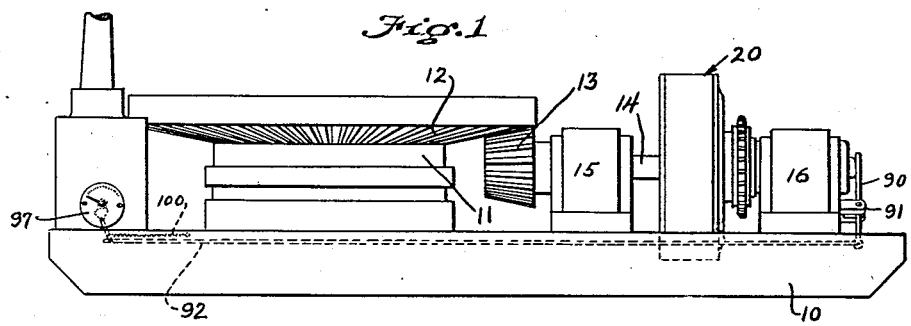
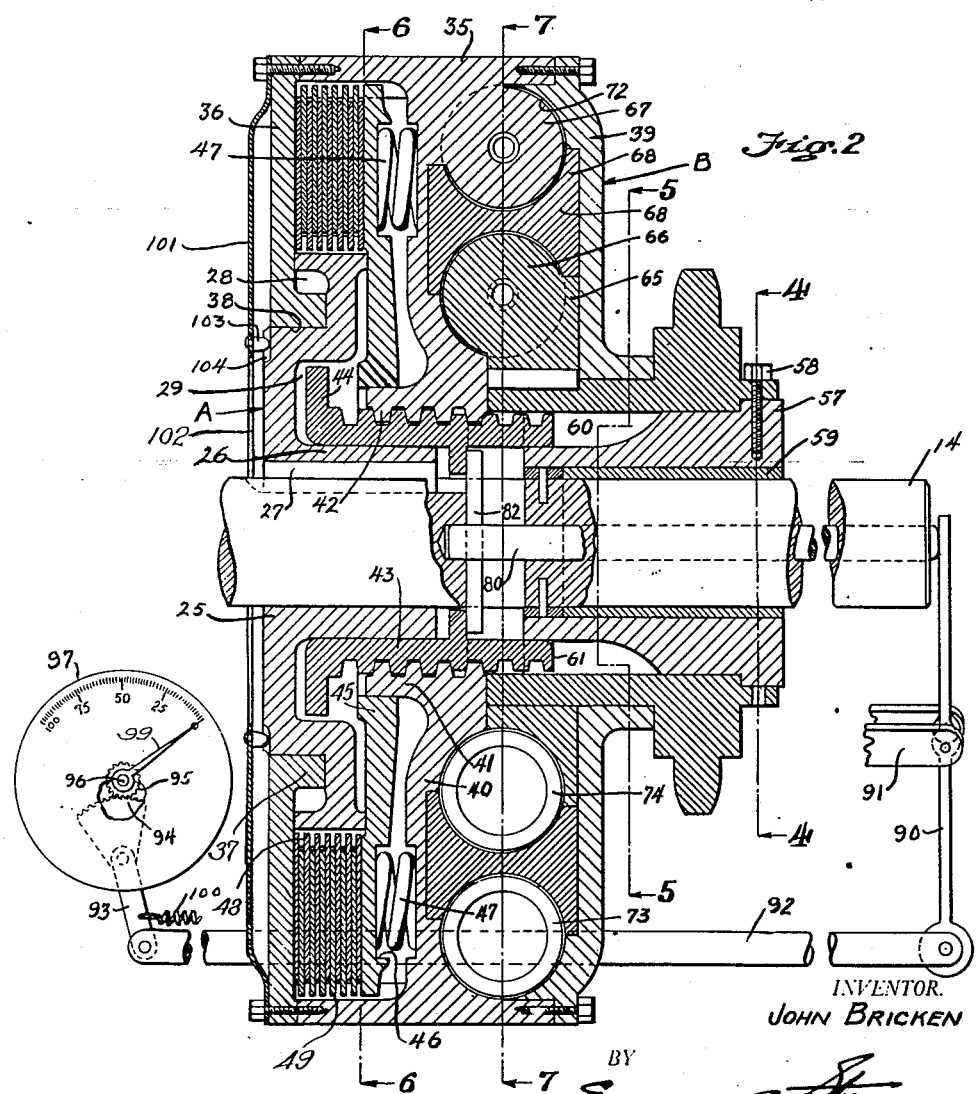
INVENTOR.
JOHN BRICKEN
BY
Edmund A. Strause
ATTORNEY.

Jan. 20, 1931.  J. BRICKEN  1,789,862
SAFETY DEVICE FOR ROTATING SHAFTS AND LOAD INDICATORS
Filed March 2, 1926  3 Sheets-Sheet 2

INVENTOR.
JOHN BRICKEN
BY
ATTORNEY.

Jan. 20, 1931. J. BRICKEN 1,789,862
SAFETY DEVICE FOR ROTATING SHAFTS AND LOAD INDICATORS
Filed March 2, 1926 3 Sheets-Sheet 3
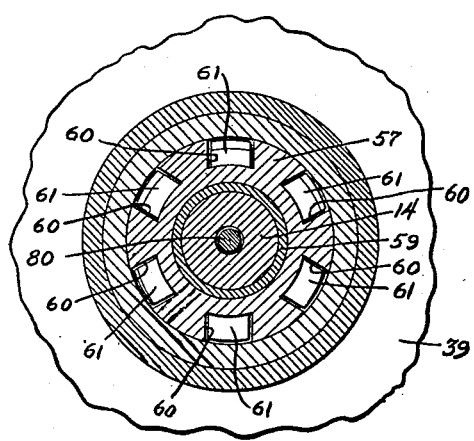
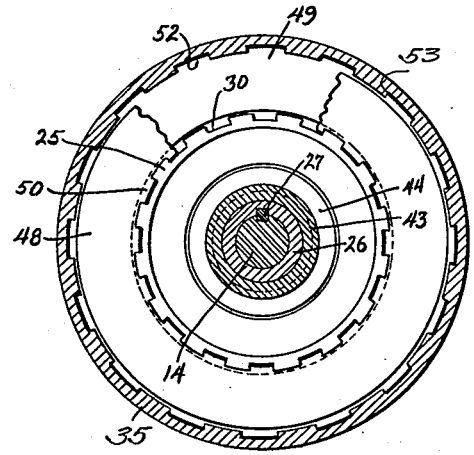
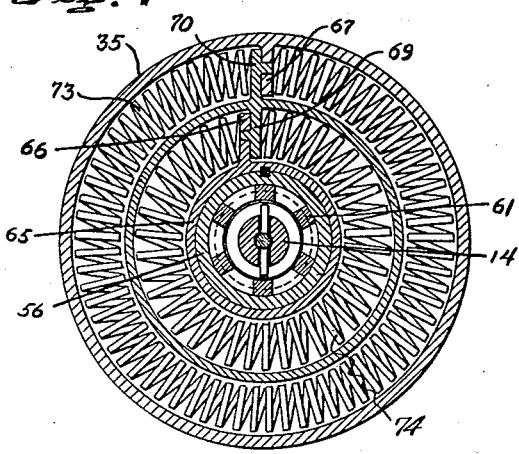
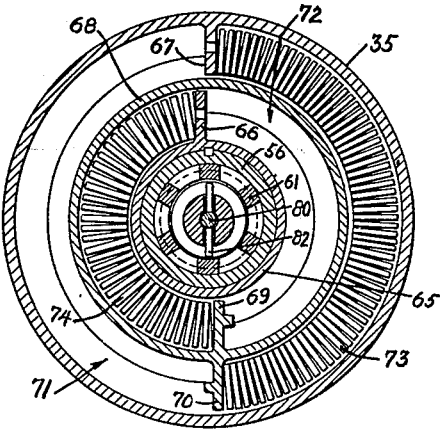
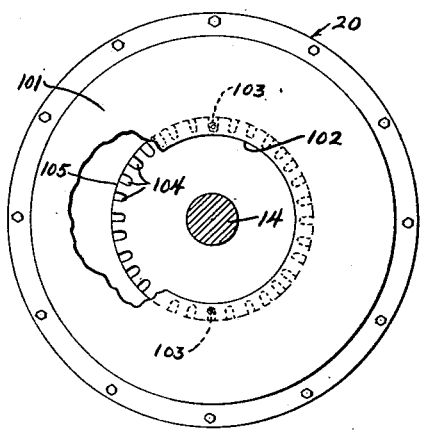
INVENTOR.
JOHN BRICKEN
BY
ATTORNEY.

Patented Jan. 20, 1931

1,789,862

UNITED STATES PATENT OFFICE

JOHN BRICKEN, OF LOS ANGELES, CALIFORNIA, ASSIGNOR OF ONE-HALF TO REGAN FORGE & ENGINEERING COMPANY, OF SAN PEDRO, CALIFORNIA, A CORPORATION OF CALIFORNIA, AND ONE-HALF TO E. F. BRITTEN, JR., OF MAPLEWOOD, NEW JERSEY

SAFETY DEVICE FOR ROTATING SHAFTS AND LOAD INDICATORS

Application filed March 2, 1926. Serial No. 91,842.

This invention relates more specifically to a safety mechanism designed to be mounted in a rotary drive shaft for instantly disconnecting the same from the element driven thereby when an overload or strain is imposed thereon.

An important object of the invention is to provide a device that may be readily engaged to a power transmitting mechanism for instantly disconnecting the same from a driven element when such element becomes overloaded.

A further object is to provide a safety mechanism in which the clutch members will be released under a load less than the maximum for which the mechanism is designed to carry without overcoming the frictional engagement of the clutch members.

Another object is to provide a safety device for use in connection with rotary well drilling apparatus in which the rotary table carrying the bit drilling stem may be instantly disconnected from its driving shaft should the drilling bit encounter geological formations that would prevent its rotation, whereby to eliminate all danger of twisting the drilling stem apart.

Another object is to provide a mechanism that will acurately measure and indicate the amount of torque imposed upon a rotating element, such as drill stem.

Still another object is to provide a mechanism that will operate to sound an audible signal the moment an overload occurs.

Other objects and advantages will become clearly apparent from the following specification when taken in connection with the drawings hereto annexed, in which Fig. 1—is a diagrammatic view of a rotary oil well drilling apparatus, showing the safety device connected to the driving element.

Fig. 2—is an enlarged central vertical section through the device operatively connected in clutched relation to a driving shaft.

Figure 3:
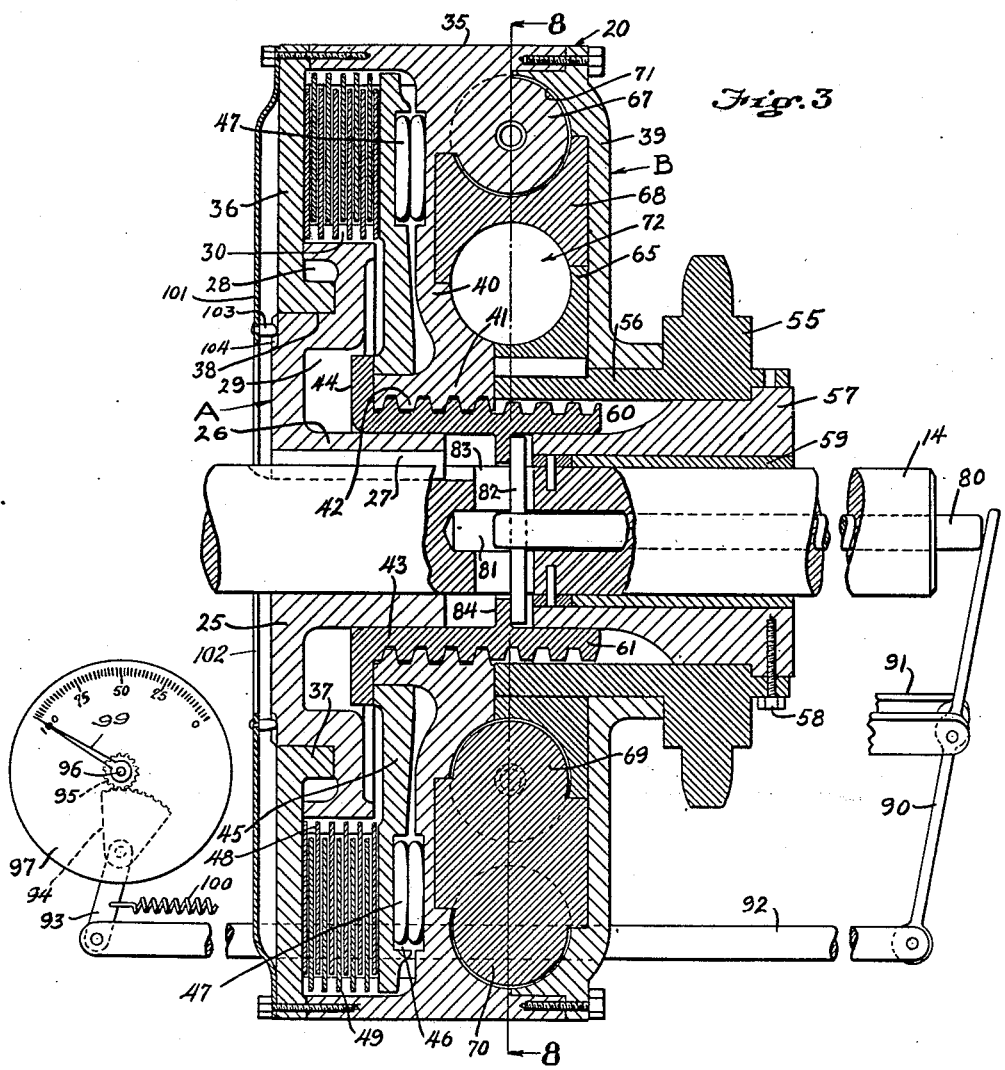

Fig. 3—is a similar view showing the device in a disconnected position.

Figure 4:
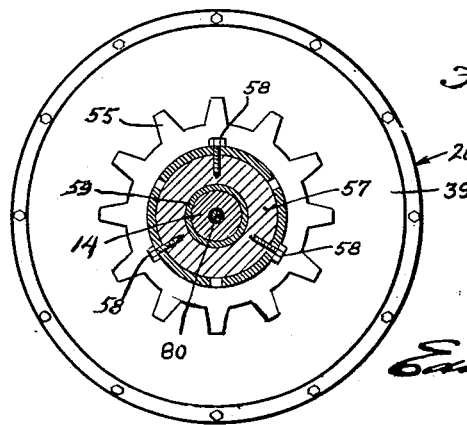

Fig. 4—is a transverse section on a reduced scale of the clutch disconnecting sleeve adjusting nut, taken on line 4—4 of Fig. 2.

Fig. 5—is a transverse section on a reduced scale through the adjusting nut and the toothed end of the disconnecting sleeve, taken on line 5—5 of Fig. 2.

Fig. 6—is a transverse section on a reduced scale, showing the method of mounting the clutch rings the outer ring being broken away, taken on line 6—6 of Fig. 2.

Fig. 7—is a like view through the spring housing the springs being shown in a normal condition taken on line 7—7 of Fig. 2.

Fig. 8—is a similar view showing the springs in a compressed position, prior to a release of the clutch members.

Fig. 9—is an end elevation on a reduced scale showing the signal mechanism.

Fig. 10—is a detail side elevation of the clutch disconnecting sleeve, on a reduced scale.

The invention is illustrated in connection with a rotary well drilling "outfit" of well known type, consisting of the usual base member 10, rotary table 11 and its support. The under surface of the table is provided with the circular gear track 12 in mesh with a bevelled pinion 13 secured to the outer end of the table drive shaft 14 that is mounted in the usual bearings 15, 16, secured to the table base member.

The safety device 20 is disposed upon the shaft 14, and preferably consists of a driven clutch member A, and a driving clutch member B, secured together in driving relation. Member A of the device preferably consists of a circular plate 25 provided with a bored hub 26 rigidly secured to the shaft 14 by a key 27. The peripheral edge of this plate is offset to one side to form an outer annular recess 28, and an inner annular recess 29 adjacent the hub 26, the periphery of the plate being provided therearound with a plurality of transversely disposed recesses 30 for the reception of some of the clutch rings as will be more fully described hereinafter.

Clutch member B, consists of a circular housing member 35 having an end closure plate 36 bolted or otherwise secured thereto. This plate is provided with a centrally disposed circular opening having a hub 37 projecting from its inner face and disposed in the annular recess 28 of the plate 25 and engaging the annular wall 38 of the recess. The opposite end of the housing is also closed by a circular plate 39 bolted along its peripheral edge to the housing. Housing member 35 is provided about mid-way between its closed ends with a partition 40 having a central hub 41 internally threaded as at 42 adapted to engage an exteriorly threaded sleeve 43 provided on its outer end with a circular flange 44 for retracting the pressure plate 45 that is movably mounted on the hub 41 of the partition or web 40 of the housing. Sleeve 43 is reciprocatingly mounted on the hub 26 of the driven member and its mode of operation in retracting the pressure plate 45 will be described further on.

The oppositely disposed faces of web 40 and pressure plate 45 are each provided with a plurality of circular recesses 46, the recesses being oppositely disposed and mounted in these recesses are coiled compression springs 47, the springs normally forcing the pressure plate against a plurality of friction clutch rings 48, 49, disposed between the opposed faces of the pressure plate 45 and the closure plate 36. Rings 48 are provided around their inner circular edge with a plurality of teeth 50, spaced apart that slidingly mesh with transversely disposed notches 30 formed on the peripheral edge of plate 25 of the driven clutch member, while rings 49 are provided on their outer circular edges with a plurality of teeth 52, that engage transversely disposed notches 53 formed on the inner surface of the housing 35. From the above it will be apparent that when the friction rings are released from engagement, rings 48 will remain stationary when the shaft 14 ceases to rotate, while rings 49 will continue to rotate with the housing member as long as power is delivered to the device. The circular cylindrical spring cavities are preferably filled with a semi-fluid lubricant that acts as a cushioning element on a reversing action of the device, and also serves to continually lubricate the various mechanisms.

The driving member of the device preferably consists of a driving sprocket 55, connected to a suitable source of power (not shown) and is provided with a bored hub 56, that surrounds the adjacent end of threaded sleeve 43, its inner end contacting with the hub 41 of the partition or housing web 40. Sprocket 55 is secured to a sleeve 57 by bolts 58, which in turn is mounted on a bushing 59 disposed on shaft 14. In order that the flange 44 of the threaded sleeve 43 may be adjusted to and from the pressure plate 45, the inner end of said sleeve 57 is provided on its periphery with a plurality of radially disposed recesses 60 that engage at all times a plurality of teeth 61 formed on the adjacent end of the threaded sleeve 43. By means of the above mechanism the flange 44 of the sleeve may be adjusted to and from the pressure plate 45 so that the plate will be operated to release the clutch rings from frictional engagement at various predetermined overloads, thus when the flange 44 is in the position shown in Fig. 2 a maximum overload will be required to effect a release of the clutch members.

In order to provide for a continuation of power delivered to the safety device on a stoppage of the driving shaft, and until the flange of the threaded sleeve 43 reaches the pressure plate 45 to positively release the driving and driven members, a yieldable mechanism is provided, that preferably consists of a circular ring 65 keyed to the hub of the sprocket and concaved on its outer face, said concavity being of quadrant form in cross section, the face of the partition disposed opposite the ring is also similarly concaved, the concaved portions forming a semicircular concavity. Ring 65 is provided on its concaved portion with a circular flat winged abutment 66, formed integrally therewith, said abutment projecting into the semicircular concavity formed by the concave face of the ring 65 and the opposite concavity formed in the face of the partition 40. Directly above the semicircular concavity a similar concavity is formed between the partition and the closure plate 39. Projecting into this concavity is a winged abutment 67 similar in form to the abutment 66, said abutment being formed integral with the partition and housing 35, (see Fig. 3). Movably mounted between the concavities heretofore mentioned is a circular ring 68 concaved on its inner and outer peripheries the concavities being semicircular in cross section, the plate 39 and the partition 40 being cut away to form bearing seats for the ring as clearly shown in Figs. 2 and 3 of the drawing. Projecting from each of the surfaces of the concavities of ring 68 and transversely disposed one above another are a pair of circular winged abutments 69, 70, formed integrally with the ring.

Disposed in the circular cylindrical concavities 71, 72, thus formed by the rings and housing members of the device, are a pair of coiled compression springs 73, 74, spring 73 being disposed between abutments 67 and 70, while spring 74 is disposed between abutments 66, 69.

On a stoppage of the table driving shaft and before the threaded sleeve 43 can complete its clutch releasing movement, the ring 65 will rotate independently of the other mechanism of the device, the abutment 66 compressing spring 74, thereby rotating ring 68 through the medium of abutment 69 a part of a revolution. As the coiled spring 74 is interposed between the abutment plate 66 and the ring abutment 69 it will be apparent that the power of the compressed spring 74 will be communicated to the spring 73 through the abutment 69 thus causing the ring 65 to rotate another part of a revolution, or a full complete revolution of the spring operated members. Before the above operation can be completed the threaded sleeve will have advanced toward the sprocket member, its flange 44 contacting against the pressure plate 45 to force the same out of engagement with the clutch rings and thus release the driving and driven members of the clutch, the driving member continuing to rotate until the overload on the drill stem is reduced to allow a resumption of an operation of the device. As soon as the clutch driving member has ceased operation the coiled springs 73, 74, will rotate the threaded sleeve 43 in rearwardly direction to its normal operating position with its flange 44 out of engagement with the pressure plate 45 the coiled springs 47, forcing the plate against the clutch rings to maintain the driving and driven members in clutched relation.

In order to accurately indicate the amount of torque imposed upon the drill stem disposed in the rotary table during its operation an indicating mechanism is employed that preferably consists of a cylindrical rod 80, reciprocatingly mounted in a bore 81, of the inner end of driving shaft 14, the outer end of the rod normally projecting a slight distance beyond the end of the driving shaft, when the apparatus is in clutched relation, (see Fig. 2). The inner end of rod 80 carries a transversely disposed pin 82 that extends in a transversely disposed slot 83 of the shaft 14, the ends of said pin projecting beyond the peripheral surface of the shaft and adapted to be engaged by a circular flange 84 formed integral with the threaded sleeve 43 and projecting from the surface of the bore of said sleeve to force the rod 80 outwardly on a reciprocation of the threaded sleeve. The indicating mechanism which is operated by the rod 80 preferably consists of an arm 90 pivotally mounted between a pair of supporting bars 91 and its lower end is pivotally connected to an operating rod 92 that is disposed below the driving shaft 14 and lying parallel therewith. The outer end of rod 92 carries a pivoted link 93 extending upwardly therefrom to which is secured a segmental gear member 94 that meshes with a pinion 95 fast to a shaft 96 rotatively mounted on an indicating dial 97, the dial being rigidly supported in any well known manner. The pinion shaft 96 carries a pointer 99 that is rotated by the pinion on a movement of rod 92, and link 93 is provided with a coiled pull spring 100 for normally maintaining the pointer at "zero" as shown in Fig. 2. The method of operating this mechanism will be clearly apparent, should the threaded sleeve 43 be adjusted to the position shown in Fig. 2, the slightest forward reciprocation of said sleeve member will cause rod 80 to be forced outwardly in its bore 81 to rock the arm 90 and operate the indicating pointer to indicate the torque or overload on the drill stem.

In order to provide for a release of the driving and driven members of the device under various predetermined overload pressures, the bolts that secure the sleeve 57 to the sprocket 55 are removed and said sleeve is rotated to advance or retract the threaded sleeve 43 in order that the flange on the end of sleeve 43 will contact with the pressure plate 45 to effect a release through the medium of the friction rings of the driving and driven members of the device. As illustrated in Fig. 2 the sleeve 43 is disposed at its greatest distance from the pressure plate, and consequently the clutch members would not be released until the maximum overload was attained.

In order that the operators or engineers may be advised when the clutch members are disconnected so that they may immediately reduce the overload or shut off the power to the apparatus, I have provided a simple signal mechanism, which preferably consists of a thin circular metal plate 101, bolted at its periphery to the driving member of the device, the plate being spaced from the closure plate 36 as clearly shown in Figs. 2 and 3 of the drawings. The plate 101 is provided at the center thereof with an opening 102 to provide for the passage of the driving shaft 14 therethrough, and secured at the edge of the opening and diametrically opposite each other are inwardly projecting lugs 103, that successively engage a series of radially disposed notches 104 formed on the circular edge 105 of the circular plate 25 of the driven clutch member, clearly shown in Figs. 2 and 3 of the drawing. When the clutch members are disconnected the driving member will continue to revolve carrying the disk 101 therewith and causing the lugs 103 to engage the notches 104, and thus sound an alarm or signal.

From the above description it will be clear that I have provided a safety device whereby the driving shaft of a rotary oil well drilling "outfit", may be instantly disconnected from its driven members whenever a predetermined overload is imparted to the drilling stem, or on its stoppage.

What I claim is:

1. A power transmitting device comprising a driving shaft, a driven clutch member rigidly secured to said shaft, a driving clutch member loosely mounted on said shaft, means for frictionally connecting the said clutch members in driving relation, means for disconnecting said clutch members under an overload, and a yieldable mechanism arranged for storing the driving power prior to the release of the driving member from the driven member.

2. A power transmitting device comprising a driven member and a loosely mounted member normally held in clutched relation to each other, means for effecting a release of said members under an overload, and a resilient means connected to the loosely mounted member and acting simultaneously with the clutch member releasing means and cooperating therewith for storing the driving power prior to the release of said members.

3. A power transmitting device in combination with a driving member and a member to be driven, of a clutch mechanism for drivingly connecting said members together, means for positively releasing said clutch mechanism, and a spring operated mechanism for absorbing the driving power of the device prior to an operation of the clutch releasing mechanism.

4. In a power transmitting mechanism, the combination with a driving member and a member to be driven, of a clutch mechanism for drivingly connecting said members together, means for positively releasing said clutch mechanism under an overload, and a mechanism operated by said means for indicating the amount of torque imposed upon the driven mechanism.

5. A power transmitting device comprising a pair of clutch members, friction means for connecting said members in driving relation to each other, means to release said members under an overload, and resilient means connected with one of the clutch members for absorbing the driving power delivered to the transmitting device prior to effecting a release of the clutch members.

6. A power transmitting mechanism consisting of a pair of clutch members adapted to be mounted on a power driving shaft, one of said members being keyed to said shaft and the other loosely mounted thereon, friction plates interposed between said clutch members to connect the same in driving relation, spring operated means to normally press the friction plates in friction tight relation to each other, and means comprising an axially movable sleeve acting on the spring operated means to release the friction plates on the application of an overload applied to the driving shaft.

7. A power transmitting device in combination with a power transmitting shaft, a driven clutch member fixedly secured to the power shaft, a driving clutch member loosely mounted on said shaft, a plurality of flat friction rings carried by both clutch members arranged in superimposed relation, a spring pressed plate bearing against said rings to normally hold the same in frictional engagement, whereby the clutch members are maintained in clutched engagement with each other, means to force the spring pressed plate out of engagement with the friction rings to release the clutch member from driving engagement on the application of an overload to the power transmitting shaft, means to apply power to the driving clutch member, and a resiliently actuated mechanism connected to the driving clutch member for absorbing the power of the shaft driving means prior to the release of the clutch members.

8. A power transmitting device including driving and driven clutch elements, means for frictionally holding said elements in clutched engagement, means comprising a reciprocable member for releasing said elements under an overload, and spring means actuatable simultaneously with said releasing means for storing the driving power prior to a release of the clutch elements.

9. In a power transmitting mechanism, the combination with a driving member and a member to be driven, of a clutch mechanism for drivingly connecting said members together, means for positively releasing said clutch mechanism under an overload, and a mechanism connected to said clutch releasing mechanism for indicating the amount of torque imposed upon the driven mechanism.

10. In a power transmitting mechanism, the combination with a power transmitting shaft having a driving member loosely mounted thereon and a member to be driven rigidly secured thereto, a clutch mechanism including a plurality of friction clutch rings arranged in superimposed relation to each other, a portion of said rings being movably secured to the driving member and the remainder to the driven member, a plate for normally pressing the rings in frictional clutched engagement with each other, a plurality of coiled springs disposed between the driving member and said plate for exerting pressure thereagainst, an externally threaded sleeve having an outwardly extending annular flange at one end and a series of teeth at its opposite end reciprocatingly mounted on the driven member, the threaded sleeve engaging a correspondingly threaded portion of the driving member, a sleeve carrying a driving sprocket and having a notched inner end mounted on said power shaft, the notches meshing with the teeth of the threaded sleeve to permit reciprocation of said sleeve on the communication of an overload to the power shaft, whereby to cause the annular flange on the threaded sleeve to contact with the pressure plate to move the same out of contact with the friction clutch rings to release the driving and driven members, and a resilient mechanism rotatively mounted within the driving member and connected to the driving sprocket for absorbing a continuation of power delivered to the device when an overload is encountered and prior to a releasing movement.

11. Apparatus of the class described comprising a clutch, and driving means therefor, said means comprising inner, outer, and intermediate concentrically mounted, relatively movable rings arranged to permit substantially an entire rotation of the inner ring with reference to the outer ring, said rings being chambered, and springs in said chambers adapted to store up power when said rings are relatively moved thereby providing a yieldable driving mechanism responsive to the load on the clutch.

12. In combination a clutch member, a drive member therefor, and a yielding mechanism between said clutch and drive member to permit rotation of one of said members relatively to the other, said mechanism comprising a ring having a pair of channels, said clutch member and drive member having channels cooperating with the channels of said ring to provide circular passages, said drive member having an abutment extending into one of said passages, said clutch member having an abutment extending into the other passage, said ring having a pair of abutments one extending into each of said passages, a spring disposed in each of said passages and confined between the abutments therein whereby said drive member is adapted to actuate said clutch member by means of said springs and ring and is movable relatively to said clutch upon the overloading of the latter.

13. Apparatus of the class described comprising a clutch, a clutch release plate therefor, a drive member, a yielding mechanism between the clutch and drive member for permitting relative movement thereof upon the overloading of the clutch, a reciprocatable element rotatable with the drive member and threadedly engaged with said clutch, said element being movable, upon relative movement of the clutch and drive member, in a direction to actuate said release plate to disconnect the clutch and drive member.

14. Apparatus of the class described comprising a clutch, a clutch release plate therefor, a drive member, a yielding mechanism between the clutch and drive member for permitting relative movement thereof upon the overloading of the clutch, a reciprocatable element rotatable with the drive member and threadedly engaged with said clutch, said element being movable, upon relative movement of the clutch and drive member, in a direction to actuate said release plate to disconnect the clutch and drive member, said yielding mechanism serving to actuate said element in the opposite direction to re-establish the driving relation between the clutch and drive member upon the release of the overload.

15. The combination with a clutch of a driving member therefor, a yielding mechanism between the clutch and driving member to permit of relative movement of said members upon the overloading thereof, a releasing member actuatable by said driving member in a direction to release the clutch during such relative movement of said driving member and clutch, and a torque gauge actuatable by said releasing member.

16. The combination with a clutch, a driven shaft upon which the clutch is mounted, said shaft having communicating axial and transverse passages therein, a drive member for said clutch, yielding mechanism between the clutch and drive member to permit relative movement thereof upon the overloading of the clutch, a sleeve threaded to the clutch and rotatable by said drive member and arranged to move laterally upon such relative movement of said clutch and drive member, a rod slidably disposed in the axial passage of said shaft and having a transverse pin extending through the transverse passage for engagement by said sleeve, a torque indicating gauge, and operating means therefor actuatable by said slidable rod.

17. Apparatus of the class described comprising a shaft, a driven clutch member secured thereto, said clutch member having a plurality of friction disks, a drive clutch member provided with a plurality of disks interleaved with said other disks, said drive clutch member having a hub, a clutch plate slidable on said hub, springs urging said plate in a direction to compress said disks to lock said clutch members together, said hub being internally threaded, a threaded sleeve in said hub having a flange, a drive member yieldingly coupled to said clutch drive member whereby said members can move relatively one to the other upon the overloading of the clutch, such relative movement serving to actuate said sleeve in a direction to cause said flange to engage said plate and move the same to clutch releasing position.

18. A yielding driving mechanism comprising a driving member, a driven member, an intermediate ring member and springs interposed between said members, said members being arranged to permit substantially one entire rotation of the driving member with respect to the driven member upon the imposition of a predetermined load on the latter.

19. A yielding driving mechanism comprising a driving member having a spring engaging abutment on its outer periphery, a driven member having an inwardly extending abutment and an intermediate ring having oppositely directed abutments, one cooperating with each of said other abutments for confining springs therebetween.

20. A driving mechanism comprising a driving member having an abutment on its periphery, a ring member surrounding said drive member, a driven member surrounding said ring and having an inwardly directed abutment, said ring having oppositely directed abutments each cooperating with one of said other abutments for confining springs therebetween to provide a construction yieldable upon the predetermined overloading of the driven member, and means actuatable by said driven member upon movement thereof relatively to said drive member for indicating such relative movement.

21. A driving mechanism comprising a driving member having an abutment on its periphery, a ring member surrounding said drive member, a driven member surrounding said ring and having an inwardly directed abutment, said ring having oppositely directed abutments each cooperating with one of said other abutments for confining springs therebetween to provide a construction yieldable upon the predetermined overloading of the driven member, and means actuatable by said driven member upon movement thereof relatively to said drive member for indicating such relative movement, said means comprising a reciprocable member coaxially mounted with respect to said driving member.

In witness that I claim the foregoing I have hereunto subscribed my name this 23rd day of February, 1926.

JOHN BRICKEN.